United States Patent
Shigemori

[11] Patent Number: 6,061,313
[45] Date of Patent: May 9, 2000

[54] OPTICAL DISK DRIVE HAVING A TIME CODE DETECTION DEVICE FOR RELIABLY DETECTING A TIME CODE OF A RECORDABLE OPTICAL DISK

[75] Inventor: Toshihiro Shigemori, Kanagawa, Japan

[73] Assignee: Ricoh Company, Ltd., Tokyo, Japan

[21] Appl. No.: 09/058,814

[22] Filed: Apr. 13, 1998

[30] Foreign Application Priority Data

Apr. 14, 1997 [JP] Japan ..................................... 9-113501

[51] Int. Cl.[7] ...................................................... G11B 5/09
[52] U.S. Cl. ................................................ 369/47; 369/32
[58] Field of Search ........................... 369/32, 33, 44.27, 369/44.28, 44.31, 47, 48, 54

[56] References Cited

FOREIGN PATENT DOCUMENTS

| 0 623 921 | 11/1994 | European Pat. Off. . |
| 98106712 | 12/1999 | European Pat. Off. . |
| 1-267871 | 10/1989 | Japan . |
| 3-194778 | 8/1991 | Japan . |
| 6-290462 | 10/1994 | Japan . |
| 7-320388 | 12/1995 | Japan . |
| 8-129759 | 5/1996 | Japan . |

*Primary Examiner*—Paul W. Huber
*Attorney, Agent, or Firm*—Dickstein Sharpiro Morin & Oshinsky L L P

[57] ABSTRACT

An optical disk drive includes a first detection unit which detects a first time signal and a first error signal, the first time signal indicating a time code of pregrooves of a recordable optical disk, the first error signal being indicative of an error of the first time signal. A second detection unit detects a second time signal and a second error signal, the second time signal indicating a time code of recorded data of the disk, the second error signal being indicative of an error of the second time signal. A time determination unit determines the first time signal as being a current time when no error of the first time signal is indicated by the first error signal, and determines the second time signal as being the current time when an error of the first time signal is indicated by the first error signal and no error of the second time signal is indicated by the second error signal. A comparator detects whether the determined current time matches with a target time. An encoder starts writing data to the disk when a coincidence of the determined current time and the target time is detected.

10 Claims, 5 Drawing Sheets

FIG.5

| S0,S1 | CONTROL CODE | "1" | TRACK NUMBER | X | TIME-IN-TRACK CODE (MIN., SEC., FRAME) | "0" | TIME-IN-DISK CODE (MIN., SEC., FRAME) | CRC |

FIG.6

| SYNC CODE | TIME-IN-DISK CODE (MIN., SEC., FRAME) | CRC |

OPTICAL DISK DRIVE HAVING A TIME CODE DETECTION DEVICE FOR RELIABLY DETECTING A TIME CODE OF A RECORDABLE OPTICAL DISK

BACKGROUND OF THE INVENTION (1) Field of the Invention

The present invention generally relates to an optical disk drive, and more particularly to an optical disk drive having a time code detection device which detects a time code of a recordable optical disk on the optical disk drive.

(2) Description of the Related Art

Compact disks, including a CD-R (compact disk-recordable), a CD-E (compact disk-erasable) and a CD-RW (compact disk-rewritable) are types of known optical disks. Generally, in the CD-R, data can be written only one time, and in the CD-E and the CD-RW, data can be written many times.

In a compact disk, a time code is written to a channel Q of a subcode, as part of recorded data of the disk, for each of a plurality of sectors (or blocks) of the disk. The time code indicates a current time with respect to one of the plurality of sectors (or blocks) of the disk.

FIG. 5 shows a format of a channel Q of a subcode of a compact disk.

As shown in FIG. 5, in the channel Q of the subcode, a subcode frame sync code "S0", a subcode frame sync code "S1", a control code, a track number, a time-in-track code, a time-in-disk code, and a CRC (cyclic redundancy check) code are provided. Each of the time-in-track code and the time-in-disk code includes a minute portion, a second portion, and a frame portion.

In a recordable optical disk of the above type, such as the CD-R or the CD-RW, pregrooves are provided as part of recorded data of the disk, and the pregrooves are used to indicate a time code which provides a reference position of the disk for starting writing of data to the disk. The pregrooves are formed so as to wobble on the disk in a sinusoidal pattern. The pregrooves provide a wobbling signal when the disk is accessed by an optical disk drive. Typically, the wobbling signal has its central frequency at 22.05 kHz. In order to indicate a time code for one of a plurality of sectors (or blocks) of the disk, the wobbling signal is frequency modulated in accordance with the time code, and its frequency modulation factor is set at ±1 kHz with the central frequency of 22.05 kHz.

The time code indicated by the wobbling signal of the pregrooves of the disk is called an ATIP (absolute time in pregroove) frame.

FIG. 6 shows a format of an ATIP frame of a recordable optical disk.

As shown in FIG. 6, in the ATIP frame, a sync code, a time-in-disk code, and a CRC (cyclic redundancy check) code are provided. The time-in-disk code includes a minute portion, a second portion, and a frame portion.

In an existing optical disk drive which is capable of rewriting data to a recordable optical disk, an ATIP frame is read from a current sector of the disk so that a time code of the ATIP frame for the current sector of the disk is detected. A position of the sector at which the rewriting of data to the disk is started is determined by the detected time code. In the recordable optical disk, data is recorded in a format which is the same as the format for recording of data in the compact disk shown in FIG. 5.

Japanese Laid-Open Patent Application No. 6-290462 discloses a time code detection device which detects a time code indicated by a wobbling signal of pregrooves of a compact disk.

However, after a time code is recorded in pregrooves of a recordable compact disk, such as the CD-R or the CD-RW, the wobbling signal of the pregrooves is influenced by the recorded data of the disk, and a signal-to-noise (S/N) ratio of the wobbling signal may be degraded. In a case in which the S/N ratio of the wobbling signal is significantly low, an error of demodulation of the ATIP frame may occur.

For example, when data is rewritten to a non-recorded area adjacent to recorded areas of the recordable compact disk, the demodulation error of the ATIP frame is likely to occur. In such a case, the time code detection device of the above-mentioned publication cannot provide a time code of the disk for the optical disk drive due to the demodulation error. The optical disk drive cannot reliably perform a writing operation for the disk.

It is difficult for the time code detection device of the above-mentioned publication to reliably provide a time code of a recordable compact disk for the optical disk drive when an error of the time code has occurred.

SUMMARY OF THE INVENTION

An object of the present invention is to provide an optical disk drive having an improved time code detection device in which the above-described problems are eliminated.

Another object of the present invention is to provide an optical disk drive having a time code detection device which reliably provides a time code of a recordable optical disk for the optical disk drive even when a demodulation error of the time code has occurred.

The above-mentioned objects of the present invention are achieved by an optical disk drive for accessing a recordable optical disk based on a reflection beam from the disk when a laser beam is emitted to the disk, the optical disk drive comprising: a first detection unit which detects a first time signal and a first error signal, the first time signal indicating a time code of pregrooves of the disk, the first error signal being indicative of an error of the first time signal; a second detection unit which detects a second time signal and a second error signal, the second time signal indicating a time code of recorded data of the disk, the second error signal being indicative of an error of the second time signal; a time determination unit, connected to both the first detection unit and the second detection unit, which determines the first time signal as being a current time when no error of the first time signal is indicated by the first error signal, and determines the second time signal as being the current time when an error of the first time signal is indicated by the first error signal and no error of the second time signal is indicated by the second error signal; a comparator which detects whether the current time determined by the time determination unit matches with a target time; and an encoder which starts writing data to the disk when a coincidence of the current time and the target time is detected by the comparator.

According to the present invention, when a demodulation error of a time code of pregrooves of a recordable optical disk has occurred, it is possible for the time determination unit of the present invention to provide a time code of recorded data of the disk for the optical disk drive. Therefore, the optical disk drive of the present invention is effective in reliably performing a writing operation for the disk even when a demodulation error of the time code of the pregrooves of the disk has occurred.

In the time determination unit of the present invention, when both an error of the time code of the pregrooves of the disk and an error of the time code of the recorded data of the disk have occurred, it is possible for the time determination unit to provide a predicted time code of the disk for the optical disk drive. Therefore, the optical disk drive of the present invention is effective in reliably performing a writing operation for the disk even when both the time code error of the pregrooves of the disk and the time code error of the recorded data of the disk have occurred.

In the optical disk drive of the present invention, when one of the first time signal and the second time signal does not match with the predicted time code, the time determination unit outputs a sequence error signal to the encoder, and when a writing of data to the disk by the encoder is in progress and the sequence error signal is output to the encoder, the encoder stops the writing of data to the disk. Therefore, the optical disk drive of the present invention is effective in reliably performing a writing operation for the disk.

Further, in the optical disk drive of the present invention, when a writing of data to the disk is not started by the encoder and the sequence error signal is output to the encoder, the encoder does not start the writing of data to the disk. Therefore, the optical disk drive of the present invention is effective in reliably performing a writing operation for the disk.

BRIEF DESCRIPTION OF THE DRAWINGS

Other objects, features and advantages of the present invention will become more apparent from the following detailed description when read in conjunction with the accompanying drawings in which:

FIG. 5 is a diagram for explaining a format of a channel Q of a subcode of a compact disk; and FIG. 6 is a diagram for explaining a format of an ATIP frame of a recordable optical disk.

DETAILED DESCRIPTION OF THE PREFERRED EMBODIMENTS

A description will now be given of the preferred embodiments of the present invention with reference to the accompanying drawings.

Figure 1:
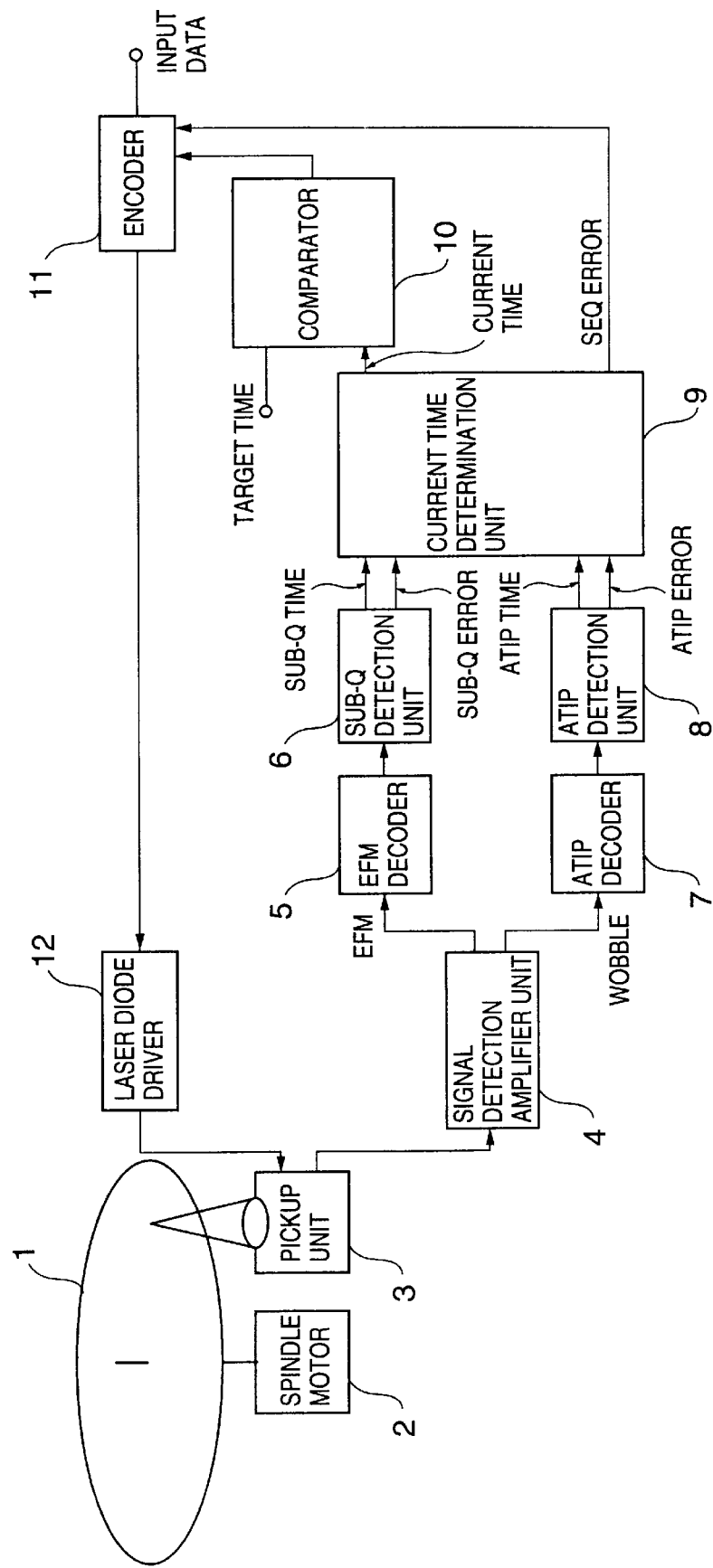
FIG. 1 is a block diagram of an optical disk drive to which one embodiment of a time code detection device of the present invention is applied.

FIG. 1 shows an optical disk drive to which one embodiment of a time code detection device of the present invention is applied.

The optical disk drive of FIG. 1 accesses a recordable optical disk 1 which may be a CD-R, a CD-E or a CD-RW. In the recordable optical disk 1, pregrooves are provided to indicate a time code of an ATIP frame. The pregrooves in the disk 1 provide a wobbling signal when the disk 1 is accessed by the optical disk drive of FIG. 1. The ATIP frame indicated by the wobbling signal of the pregrooves in the disk 1 has a format which is essentially the same as the format of the ATIP frame shown in FIG. 6.

As shown in FIG. 1, in the optical disk drive, a spindle motor 2, a pickup unit 3, a signal detection amplifier unit 4, an EFM (eight to fourteen modulation) decoder 5, a SUB-Q detection unit 6, an ATIP decoder 7, an ATIP detection unit 8, a current time determination unit 9, a comparator 10, an encoder 11, and a laser diode driver 12 are provided.

The spindle motor 2 supports and rotates the disk 1. When the optical disk drive is operating in a playback mode, the laser diode driver 12 drives a laser diode of the pickup unit 3 by using playback power so that the laser diode of the pickup unit 3 emits a laser beam to the disk 1. The pickup unit 3 receives a reflection beam from the disk 1 and converts the reflection beam to an electrical signal.

The signal detection amplifier unit 4 detects a time code of recorded data of the disk 1 and a time code of the pregrooves of the disk 1 based on the signal output from the pickup unit 3 and provides amplified signals indicating the time codes. The signal detection amplifier unit 4 outputs a playback signal ("EFM") to the EFM decoder 5, the playback signal EFM indicating a time code of a channel Q of a subcode of the disk 1. The signal detection amplifier unit 4 outputs a wobbling signal ("WOBBLE") to the ATIP decoder 7, the wobbling signal WOBBLE indicating a time code of an ATIP frame of the disk 1.

Further, in the optical disk drive, a servo control mechanism (not shown) is provided to move a light spot on the disk 1 formed by the laser beam from the pickup unit 3.

When the optical disk drive is operating in a recording mode, the encoder 11 outputs a recording signal to the laser diode driver 12 in response to input data. The laser diode driver 12 drives the laser diode of the pickup unit 3 by using recording power in accordance with the recording signal from the encoder 11, so that a writing of data to the disk 1 is performed.

In the optical disk drive of FIG. 1, one embodiment of the time code detection device of the present invention is provided. A description of one embodiment of the time code detection device of the present invention will be given.

In the present embodiment, the ATIP decoder 7 provides a demodulated signal based on the wobbling signal WOBBLE from the signal detection amplifier unit 4. The ATIP detection unit 8 provides an ATIP time signal based on the demodulated signal from the ATIP decoder 7,. The ATIP detection unit 8 outputs the ATIP time signal to the current time determination unit 9, the ATIP time signal indicating the time code of the pregrooves of the disk 1. When an error of the ATIP time signal is detected, the ATIP detection unit 8 outputs an ATIP error signal (which is set in a high state) to the current time determination unit 9. The CRC code included in the format of FIG. 6 is used for detecting an error of the ATIP time signal from the demodulated signal of the ATIP decoder 7. Otherwise the ATIP detection unit 8 outputs an ATIP error signal (which is set in a low state) to the current tine determination unit 9.

The EFM decoder 5 provides a demodulated signal based on the playback signal EFM from the signal detection amplifier unit 4. The SUB-Q detection unit 6 provides a SUB-Q time signal based on the demodulated signal from the EFM decoder 5. The SUB-Q detection unit 6 outputs the SUB-Q time signal to the current time determination unit 9, the SUB-Q time signal indicating the time code of the channel Q of the subcode of the disk 1. When an error of the SUB-Q time signal is detected, the SUB-Q detection unit 6 outputs a SUB-Q error signal (which is set in a high state) to the current time determination unit 9. The CRC code included in the format of FIG. 5 is used for detecting an error of the SUB-Q time signal from the demodulated signal from the EFM decoder 5. Otherwise the SUB-Q detection unit 6 outputs a SUB-Q error signal (which is set in a low state) to the current time determination unit 9.

The current time determination unit 9 detects whether the ATIP error signal from the ATIP detection unit 8 is set in the high state. When the ATIP error signal is not set in the high state (or in the low state), the current time determination unit 9 determines the ATIP time signal from the ATIP detection unit 8 as being a current time. The current time indicates a specific time code with respect to one of the plurality of sectors (or blocks) of the disk 1 at which writing of data to the disk 1 is to be started. The current time determination unit 9 in this case outputs the ATIP time signal to the comparator 10 as the current time.

When the ATIP error signal is set in the high state, the current time determination unit 9 detects whether the SUB-Q error signal from the SUB-Q detection unit 6 is set in the high state. When the SUB-Q error signal is not set in the high state (or in the low state), the current time determination unit 9 determines the SUB-Q time signal from the SUB-Q detection unit 6 as being the current time. The current time determination unit 9 in this case outputs the SUB-Q time signal to the comparator 10 as the current time.

The comparator 10 detects whether the current time determined by the current time determination unit 9 matches with a target time for starting the writing of data to the disk 1. When a coincidence of the current time and the target time is detected by the comparator 10, the comparator 10 outputs a coincidence signal (which is set in a high state) to the encoder 11. Otherwise the comparator 10 outputs a coincidence signal (which is set in a low state) to the encoder 11.

When the coincidence signal from the comparator 10 is set in the high state, the encoder 11 starts writing data to the disk 1. As described above, the encoder 11 outputs a recording signal to the laser diode driver 12 in response to input data. The laser diode driver 12 drives the laser diode of the pickup unit 3 by using a recording power in accordance with the recording signal from the encoder 11, so that the writing of data to the disk 1 is performed:

Accordingly, in the present embodiment of the time code detection device, it is possible for the current time determination unit 9 to reliably provide a time code of the recordable optical disk 1 for the optical disk drive in a case in which an error of demodulation of the time code of the disk 1 is likely to occur. The optical disk drive of the present embodiment can reliably perform a writing operation for the disk 1.

Figure 2:
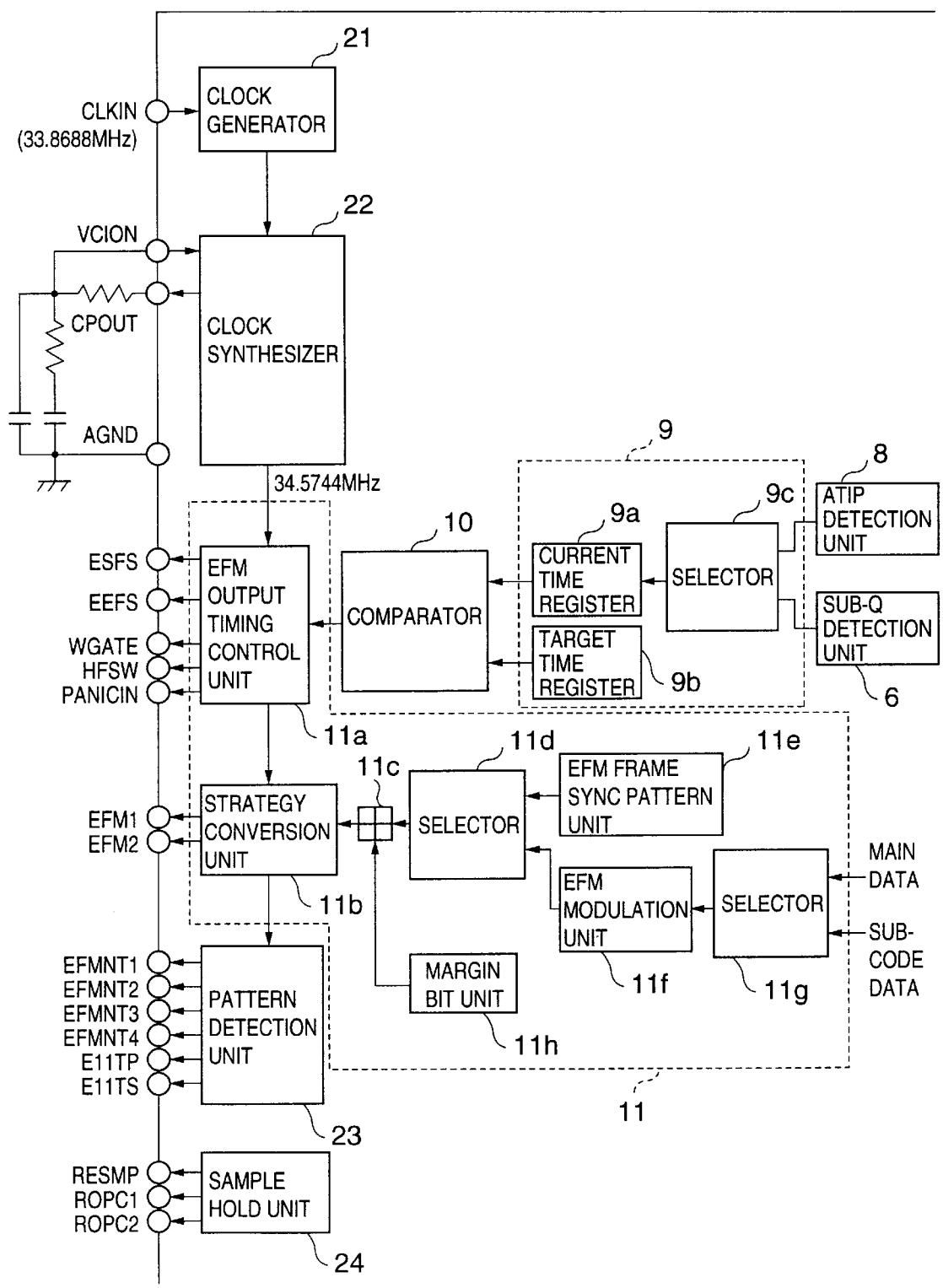
FIG. 2 is a block diagram of a current time determination unit and an encoder in the optical disk drive of FIG. 1.

FIG. 2 shows a construction of the current time determination unit 9 and the encoder 11 in the optical disk drive of FIG. 1. In FIG. 2, the elements which are the same as corresponding elements in FIG. 1 are designated by the same reference numerals, and a description thereof will be omitted.

As shown in FIG. 2, in the current time determination unit 9, a current time register 9a, a target time register 9b, and a selector 9c are provided. In the encoder 11, as shown in FIG. 2, an EFM output timing control unit 11a, a strategy conversion unit 11b, an adder 11c, a selector 11d, an EFM frame sync pattern unit 11e, an EFM modulation unit 11f, a selector 11g, and a margin bit unit 11h are provided. Further, in the optical disk drive, a clock generator 21, a clock synthesizer 22, a pattern detection unit 23, and a sample hold unit 24 are provided.

In the current time determination unit 9 of FIG. 2, the current time register 9a stores a current time output from the selector 9c, and outputs a signal indicating the stored current time to the comparator 10. The target time register 9b stores a target time for starting the writing of data to the disk 1, and outputs a signal indicating the stored target time to the comparator 10. The selector 9c outputs one of the ATIP time signal from the ATIP detection unit 8 and the SUB-Q time signal from the SUB-Q detection unit 6, to the current time register 9a. One of the ATIP time signal and the SUB-Q time signal to be output to the current time register 9a is selected by the selector 9c based on the ATIP error signal and the SUB-Q error signal.

In the encoder 11 of FIG. 2, the EFM output timing control unit 11a, the strategy conversion unit 11b, the adder 11c, the selector 11d, the EFM frame sync pattern unit 11e, the EFM modulation unit 11f, the selector 11g and the margin bit unit 11h carry out a writing or rewriting operation with respect to the disk 1 in association with the clock generator 21, the clock synthesizer 22, the pattern detection unit 23, and the sample hold unit 24. The encoder 11 of FIG. 2 outputs a recording signal to the laser diode driver 12 in response to input data, so that the laser diode driver 12 drives the laser diode of the pickup unit 3 by using a recording power in accordance with the recording signal from the encoder 11. The writing or rewriting operation of the encoder 11 of FIG. 2 is essentially the same as that described above with respect to the encoder 11 of the optical disk drive of FIG. 1. The respective operations of the elements 11a–11h of the encoder 11 are not pertinent to the time code detection device of the present invention, and a description thereof will be omitted.

The current time determination unit 9 of FIG. 1 detects whether the ATIP error signal from the ATIP detection unit 8 is set in the high state. When the ATIP error signal is not set in the high state (or in the low state), the current time determination unit 9 determines the ATIP time signal from the ATIP detection unit 8 as being the current time. The current time determination unit 9 in this case outputs the ATIP time signal to the comparator 10 as the current time.

When the ATIP error signal is set in the high state, the current time determination unit 9 detects whether the SUB-Q error signal from the SUB-Q detection unit 6 is set in the high state. When the SUB-Q error signal is not set in the high state (or in the low state), the current time determination unit 9 determines the SUB-Q time signal from the SUB-Q detection unit 6 as being the current time. The current time determination unit 9 in this case outputs the SUB-Q time signal to the comparator 10 as the current time.

However, in the embodiment of FIG. 1, when both the ATIP error signal and the SUB-Q error signal are set in the high state, the current time determination unit 9 does not act to supply the current time to the comparator 10. That is, only when both the error of the ATIP signal and the error of the SUB-Q signal have occurred, the current time determination unit 9 supplies no current time to the comparator 10, and the encoder 11 cannot start the writing or rewriting operation with respect to the disk 1 with the time code.

Figure 3:
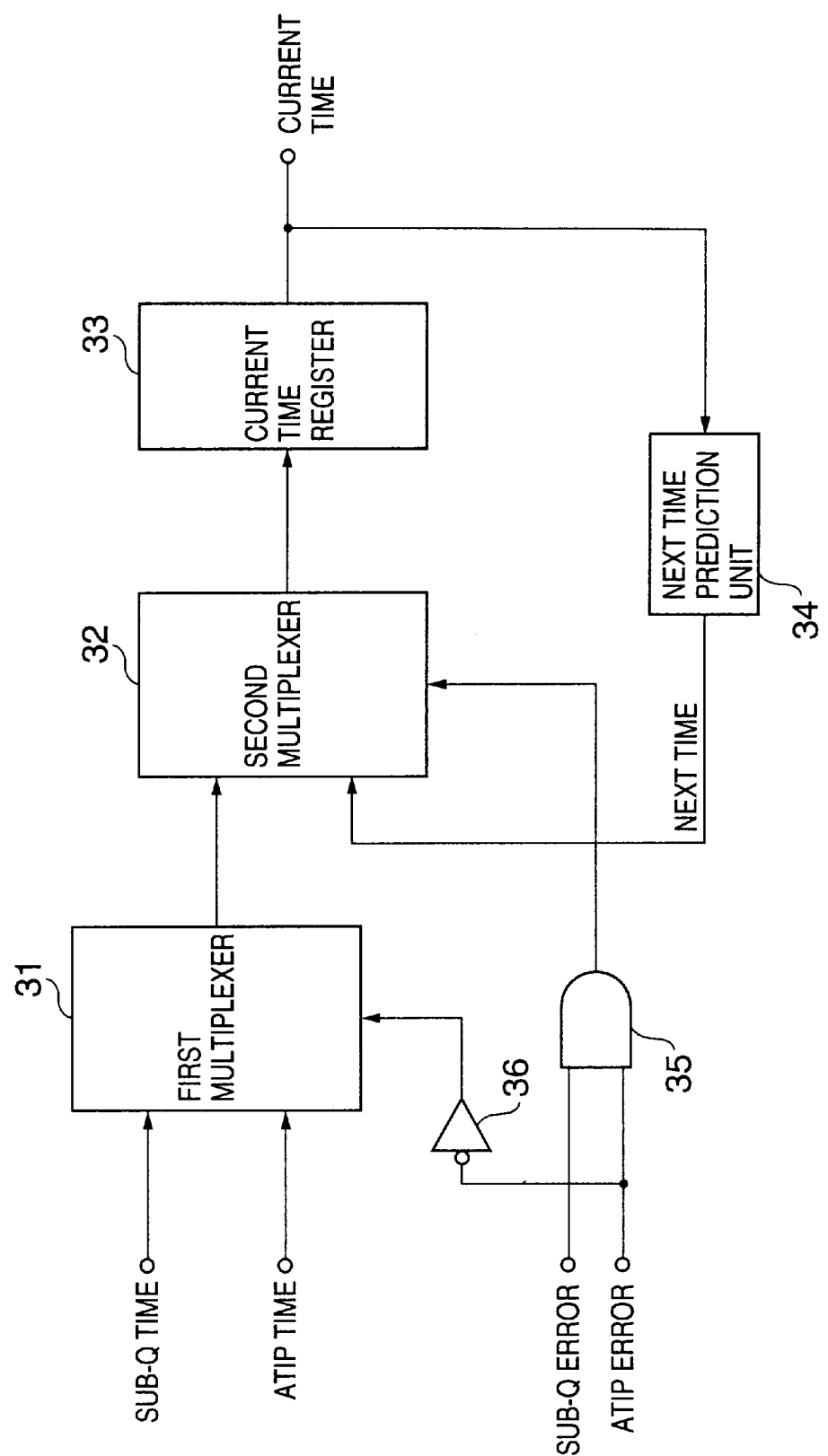
FIG. 3 is a block diagram of one embodiment of the current time determination unit in the time code detection device of the present invention.

FIG. 3 shows one embodiment of the current time determination unit in the time code detection device of the present invention.

In the present embodiment, the current time determination unit of FIG. 3 is substituted for the current time determination unit 9 in the optical disk drive of FIG. 1. As shown in FIG. 3, a first multiplexer 31, a second multiplexer 32, a current time register 33, a next time prediction unit 34, an AND gate 35, and an inverter 36 are provided in the current time determination unit of the present embodiment.

In the present embodiment, when both the ATIP error signal and the SUB-Q error signal are set in the high state, the second multiplexer 32 of FIG. 3 supplies a predicted next time (or a sum of a stored current time and a given time for a next sector of the disk 1) output from the next time prediction unit 34, to the current time register 33 as the current time. Otherwise (that is, when the ATIP error signal is set in the low state, when the ATIP error signal is set in the high state and the SUB-Q error signal is set in the low state, or when the ATIP error signal is set in the low state and the SUB-Q error signal is set in the high state) the second multiplexer 32 supplies the time signal output from the first multiplexer 31 to the current time register 33 as the current time in the same manner as the embodiment of FIG. 1. This operation of the current time determination unit of the present embodiment will be described in the following.

In the current time determination unit of FIG. 3, the ATIP time signal from the ATIP detection unit 8 and the SUB-Q time signal from the SUB-Q detection unit 6 are input to the first multiplexer 31. The ATIP error signal from the ATIP detection unit 8 and the SUB-Q error signal from the SUB-Q detection unit 6 are input to the AND gate 35. The ATIP error signal from the ATIP detection unit 8 is input to the inverter 36.

When the ATIP error signal is set in the high state, the inverter 36 outputs a low-state signal to the first multiplexer 31, and the first multiplexer 31 in such a case outputs the SUB-Q time signal to the second multiplexer 32. On the other hand, when the ATIP error signal is set in the low state, the inverter 36 outputs a high-state signal to the first multiplexer 31, and the first multiplexer 31 in such a case outputs the ATIP time signal to the second multiplexer 32. That is, when the error of the ATIP signal has occurred, the SUB-Q time signal is supplied to the second multiplexer 32. Otherwise the ATIP time signal is supplied to the second multiplexer 32.

In the current time determination unit of FIG. 3, the selected one of the ATIP time signal and the SUB-Q time signal is supplied to the second multiplexer 32 by the first multiplexer 31. In addition, a next time signal ("NEXT TIME") from the next time prediction unit 34 is input to the second multiplexer 32.

When at least one of the ATIP error signal and the SUB-Q error signal is set in the low state, the AND gate 35 outputs a low-state signal to the second multiplexer 32, and the second multiplexer 32 in such a case outputs the selected time signal (supplied by the first multiplexer 31) to the current time register 33. When both the ATIP error signal and the SUB-Q error signal are set in the high state, the AND gate 35 outputs a high-state signal to the second multiplexer 32, and the second multiplexer 32 in such a case outputs the next time signal (supplied by the next time prediction unit 34) to the current time register 33.

In the current time determination unit of FIG. 3, the current time register 33 stores the time signal output by the second multiplexer 32, and outputs the stored time signal as the current time for starting the writing of data to one of the plurality of sectors (or blocks) of the disk 1. The next time prediction unit 34 generates a predicted next time by adding the given time to the stored current time from the current time register 33, and outputs a next time signal to the second multiplexer 32, the next time signal indicating the predicted next time.

Therefore, in the current time determination unit of the present embodiment, (1) when the ATIP error signal is set in the low state (no error of the ATIP time signal occurs), the ATIP time signal is supplied to the current time register 33, (2) when the ATIP error signal is set in the high state and the SUB-Q error signal is set in the low state (the error of the ATIP time signal has occurred and no error of the SUB-Q time signal occurs), the SUB-Q time signal is supplied to the current time register 33, and (3) when both the ATIP error signal and the SUB-Q error signal are set in the high state, the next time signal is supplied to the current time register 33. Therefore, in the current time determination unit of the present embodiment, it is possible to eliminate the problem of the embodiment of FIG. 1.

Accordingly, in the present embodiment of the time code detection device, it is possible for the current time register 33 to reliably provide a time code of the recordable optical disk 1 for the optical disk drive even when both the error of the ATIP time signal and the error of the SUB-Q time signal have occurred. The optical disk drive of the present embodiment can reliably perform a writing operation for the disk 1.

Figure 4:
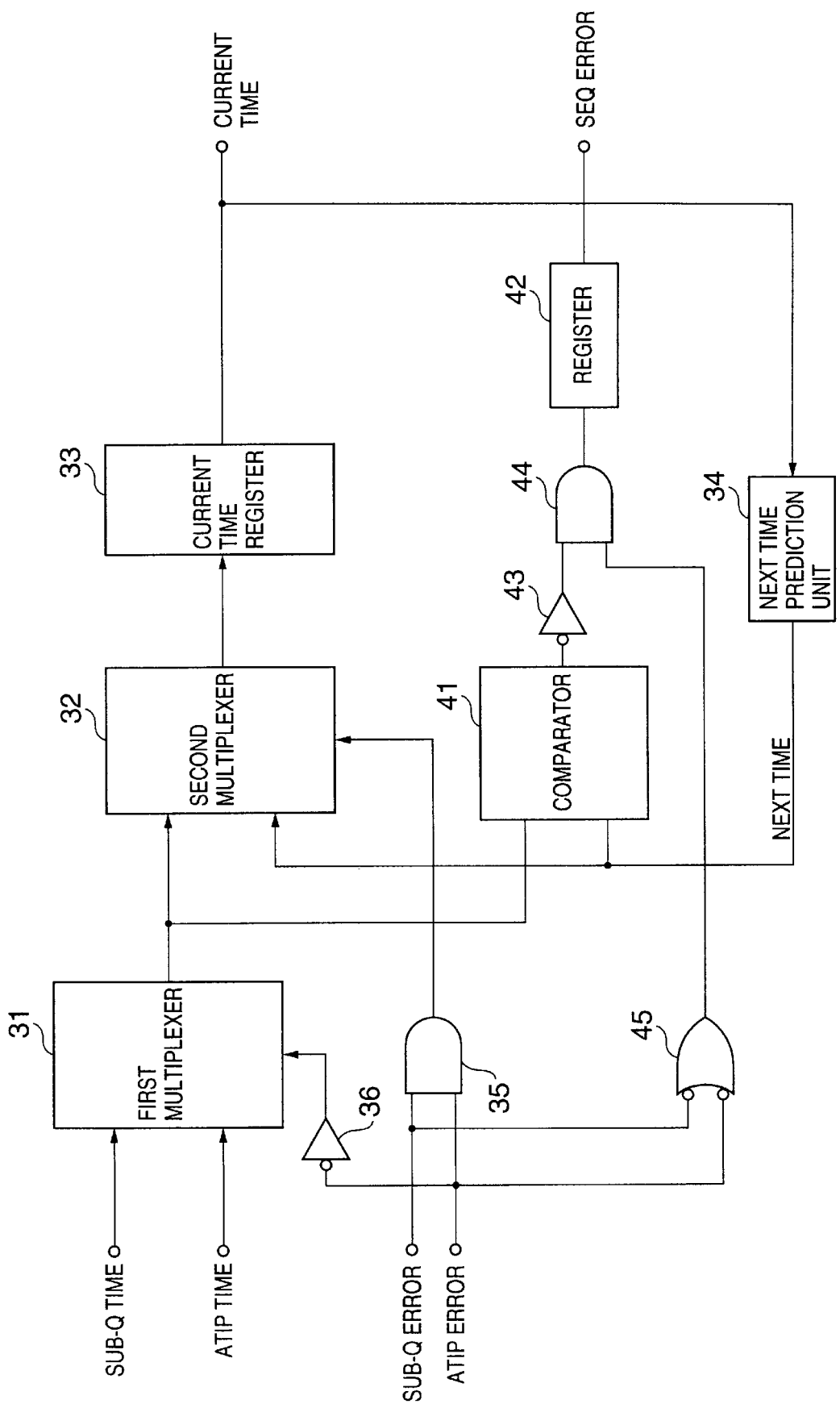
FIG. 4 is a block diagram of another embodiment of the current time determination unit in the time code detection device of the present invention.

FIG. 4 shows another embodiment of the current time determination unit in the time code detection device of the present invention. In FIG. 4, the elements which are the same as corresponding elements in FIG. 3 are designated by the same reference numerals, and a description thereof will be omitted.

In the present embodiment, the current time determination unit of FIG. 4 is substituted for the current time determination unit 9 in the optical disk drive of FIG. 1. As shown in FIG. 4, the first multiplexer 31, the second multiplexer 32, the current time register 33, the next time prediction unit 34, the AND gate 35, and the inverter 36, which are the same as corresponding element in FIG. 3, are provided in the current time determination unit of the present embodiment. Further, in the present embodiment, a comparator 41, a register 42, an inverter 43, an AND gate 44, and an OR gate 45 are provided in the current time determination unit.

In the embodiment of FIG. 3, when both the ATIP error signal and the SUB-Q error signal are set in the high state, the second multiplexer 32 of FIG. 3 supplies a predicted next time output from the next time prediction unit 34, to the current time register 33 as the current time. Otherwise the current time determination unit of the embodiment of FIG. 3 acts to supply the current time to the comparator 10 in the same manner as the embodiment of FIG. 1.

In the present embodiment, as shown in FIG. 4, when one of the ATIP error signal and the SUB-Q error signal is set in the low state, the comparator 41 detects whether one of the ATIP time signal and the SUB-Q time signal, output by the first multiplexer 31, matches with the predicted next time output by the next time prediction unit 34. When the time signal from the first multiplexer 31 does not match with the predicted next time from the next time prediction unit 34, the current time determination unit of the present embodiment outputs a sequence error signal (SEQ ERROR) to the encoder 11. The sequence error signal indicates that a sequence of the time code detected by the current time determination unit is not maintained. In the present embodiment, the sequence error signal is output to the encoder 11 before the writing of data to the disk 1 is started by the encoder 11.

In the current time determination unit of FIG. 4, the ATIP time signal from the ATIP detection unit 8 and the SUB-Q time signal from the SUB-Q detection unit 6 are input to the first multiplexer 31. The ATIP error signal from the ATIP detection unit 8 and the SUB-Q error signal from the SUB-Q detection unit 6 are input to both the AND gate 35 and the OR gate 45. The ATIP error signal from the ATIP detection unit 8 is input to the inverter 36.

When the ATIP error signal is set in the high state, the inverter 36 outputs a low-state signal to the first multiplexer 31, and the first multiplexer 31 in such a case outputs the SUB-Q time signal to the second multiplexer 32. When the ATIP error signal is set in the low state, the inverter 36 outputs a high-state signal to the first multiplexer 31, and the first multiplexer 31 in such a case outputs the ATIP time signal to the second multiplexer 32. That is, when the error of the ATIP time signal has occurred, the SUB-Q time signal is supplied to the second multiplexer 32. Otherwise the ATIP time signal is supplied to the second multiplexer 32.

Further, in the present embodiment, the selected one of the ATIP time signal and the SUB-Q time signal, output by the first multiplexer 31, is input to the comparator 41. A next time signal ("NEXT TIME") from the next time prediction unit 34 is input to the comparator 41. When the time signal from the first multiplexer 31 matches with the next time signal from the next time prediction unit 34, the comparator 41 outputs a high state signal to the inverter 43, and the inverter 43 in such a case outputs a low state signal to the AND gate 44. When the time signal from the first multiplexer 31 does not match with the next time signal from the next time prediction unit 34, the comparator 41 outputs a low state signal to the inverter 43, and the inverter 43 in such a case outputs a high state signal to the AND gate 44.

When either the ATIP error signal or the SUB-Q error signal is set in the low state, the OR gate 45 outputs a high state signal to the AND gate 44. Otherwise the OR gate 45 outputs a low state signal to the AND gate 44. Therefore, when one of the ATIP error signal and the SUB-Q error signal is set in the low state and the output signal of the comparator 41 is set in the low state (or the output signal of the inverter 43 is set in the high state), the AND gate 44 outputs a high state signal to the register 42. The register 42 in such a case outputs a sequence error signal ("SEQ ERROR") which is a high state signal. Otherwise the AND gate 44 outputs a low state signal to the register 42. The register 42 in such a case outputs a low state signal (or no sequence error signal is output).

In the current time determination unit of FIG. 4, other operations of the elements 31–36 are essentially the same as corresponding operations of the embodiment of FIG. 3, and a description thereof will be omitted.

In the current time determination unit of FIG. 4, the comparator 41, the inverter 43, the AND gate 44 and the OR gate 45 constitute a comparison unit which detects whether one of the ATIP time signal and the SUB-Q time signal matches with the predicted next time from the next time prediction unit 34.

In the current time determination unit of FIG. 4, when one of the ATIP error signal and the SUB-Q error signal is set in the low state, the comparator 41 determines whether the time signal (one of the ATIP time signal and the SUB-Q time signal) output by the first multiplexer 31 matches with the predicted next time output by the next time prediction unit 34. When the time signal from the first multiplexer 31 does not match with the predicted next time from the next time prediction unit 34, the register 42 outputs the sequence error signal to the encoder 11. The sequence error signal indicates that a sequence of the time code detected by the time code detection device is not maintained. In the present embodiment, the sequence error signal is output to the encoder 11 before the writing of data to the disk 1 is started by the encoder 11.

In the current time determination unit of FIG. 4, when writing of data to the disk 1 by the encoder 11 of the optical disk drive of FIG. 1 is in progress and the sequence error signal is output to the encoder 11 by the register 42, the encoder 11 stops writing data to the disk 1. When writing of data to the disk 1 is not started by the encoder 11 and the sequence error signal is output to the encoder 11 by the register 42, the encoder 11 does not start the writing of data to the disk 1.

Accordingly, in the present embodiment of the time code detection device, it is possible for the current time register 33 to reliably provide a time code of the recordable optical disk 1 for the optical disk drive even when both the error of the ATIP time signal and the error of the SUB-Q time signal have occurred. The optical disk drive of the present embodiment can reliably perform a writing operation for the disk 1.

Further, in the present embodiment, it is possible for the register 42 to output the sequence error signal to the encoder 11 when one of the ATIP error signal and the SUB-Q error signal is set in the low state and the time signal from the first multiplexer 31 does not match with the predicted next time from the next time prediction unit 34.

In the present embodiment, the encoder 11 stops the writing of data to the disk 1 when the writing of data to the disk 1 by the optical disk drive of FIG. 1 is in progress and the sequence error signal is output to the encoder 11 by the register 42. Therefore, when a sequence of the time code detected by the time code detection device is lost due to a flaw in the disk 1 or dust on the disk 1, the optical disk drive of the present embodiment can reliably perform a writing operation for the disk 1.

Further, in the present embodiment, the encoder 11 does not start writing data to the disk 1 when writing data to the disk 1 by the optical disk drive of FIG. 1 is not started and the sequence error signal is output to the encoder 11 by the register 42. Therefore, when a sequence of the time code detected by the time code detection device is lost due to a flaw in the disk 1 or dust on the disk 1, the optical disk drive of the present embodiment can reliably perform a writing operation for the disk 1.

Further, the present invention is not limited to the above-described embodiments, and variations and modifications may be made without departing from the scope of the present invention.

The present invention is based on Japanese patent application No. 9-113501, filed on Apr. 14, 1997, the entire contents of which are hereby incorporated by reference.

What is claimed is:

1. An optical disk drive for accessing a recordable optical disk based on a reflection beam from the disk when a laser beam is emitted to the disk, comprising:

a first detection unit for detecting a first time signal and a first error signal, the first time signal indicating a time code of pregrooves of the disk, the first error signal being indicative of an error of the first time signal;

a second detection unit for detecting a second time signal and a second error signal, the second time signal indicating a time code of recorded data of the disk, the second error signal being indicative of an error of the second time signal;

a time determination unit connected to both the first detection unit and the second detection unit for determining the first time signal as being a current time when no error of the first time signal is indicated by the first error signal, and for determining the second time signal as being the current time when an error of the first time signal is indicated by the first error signal and no error of the second time signal is indicated by the second error signal;

a comparator for detecting whether the current time determined by the time determination unit matches with a target time; and an encoder for starting writing data to the disk when a coincidence of the current time and the target time is detected by the comparator.

2. The optical disk drive according to claim 1, wherein the time determination unit includes a next time prediction unit for generating a predicted next time by adding a predetermined time to a stored current time, the time determination unit determining the predicted next time from the next time prediction unit as being the current time when an error of the first time signal is indicated by the first error signal and an error of the second time signal is indicated by the second error signal.

3. The optical disk drive according to claim 1, wherein the time determination unit includes:

a next time prediction unit for generating a predicted next time by adding a predetermined time to a stored current time; and a comparison unit for detecting whether one of the first time signal and the second time signal matches with the predicted next time from the next time prediction unit, wherein, when said one of the first time signal and the second time signal does not match with the predicted next time, the time determination unit outputs a sequence error signal to the encoder, and wherein, when a writing of data to the disk by the encoder is in progress and the sequence error signal is output to the encoder, the encoder stops the writing of data to the disk.

4. The optical disk drive according to claim 1, wherein the time determination unit includes:

a next time prediction unit for generating a predicted next time by adding a predetermined time to a stored current time; and a comparison unit for detecting whether one of the first time signal and the second time signal matches with the predicted next time from the next time prediction unit, wherein, when said one of the first time signal and the second time signal does not match with the predicted next time, the time determination unit outputs a sequence error signal to the encoder, and wherein, when a writing of data to the disk is not started by the encoder and the sequence error signal is output to the encoder, the encoder does not start the writing of data to the disk.

5. The optical disk drive according to claim 1, wherein the time determination unit includes a first multiplexer having an input connected to an output of the first detection unit and an input connected to an output of the second detection unit, the first multiplexer outputting the second time signal when an error of the first time signal is indicated by the first error signal, and outputting the first time signal when no error of the first time signal is indicated by the first error signal.

6. The optical disk drive according to claim 5, wherein the time determination unit further includes a second multiplexer having an input connected to an output of the first multiplexer and an input connected to an output of a next time prediction unit for generating a predicted next time by adding a predetermined time to a stored current time, the second multiplexer outputting the predicted next time from the next time prediction unit when an error of the first time signal is indicated by the first error signal and an error of the second time signal is indicated by the second error signal.

7. The optical disk drive according to claim 3, wherein the comparison unit includes a first comparator, an inverter having an input connected to an output of the first comparator, an OR gate having an input connected to an output of the first detection unit and an input connected to an output of the second detection unit, and an AND gate having an input connected to an output of the inverter and an input connected to an output of the OR gate.

8. The optical disk drive according to claim 4, wherein the comparison unit includes a first comparator, an inverter having an input connected to an output of the first comparator, an OR gate having an input connected to an output of the first detection unit and an input connected to an output of the second detection unit, and an AND gate having an input connected to an output of the inverter and an input connected to an output of the OR gate.

9. The optical disk drive according to claim 1, wherein the first time signal detected by the first detection unit indicates a time code provided in an absolute-time-in-pregroove frame of the disk.

10. The optical disk drive according to claim 1, wherein the second time signal detected by the second detection unit indicates a time code provided in a channel Q of a subcode of the disk.

* * * * *